US012527262B2

(12) United States Patent
Chung et al.

(10) Patent No.: US 12,527,262 B2
(45) Date of Patent: Jan. 20, 2026

(54) HEDGE TRIMMER

(71) Applicant: Techtronic Cordless GP, Anderson, SC (US)

(72) Inventors: Koon For Chung, New Territories (CN); Danny Wang, Dongguan (CN); Tim Xie, Foshan (CN); Todd Rickey, New Territories (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 835 days.

(21) Appl. No.: 17/537,338

(22) Filed: Nov. 29, 2021

(65) Prior Publication Data

US 2022/0078978 A1 Mar. 17, 2022

Related U.S. Application Data

(62) Division of application No. 15/776,555, filed as application No. PCT/CN2015/094903 on Nov. 18, 2015, now Pat. No. 11,185,015.

(51) Int. Cl.
*A01G 3/053* (2006.01)
*F16H 3/66* (2006.01)
(Continued)

(52) U.S. Cl.
CPC .............. *A01G 3/053* (2013.01); *F16H 3/66* (2013.01); *H02K 7/108* (2013.01); *H02K 7/116* (2013.01);
(Continued)

(58) Field of Classification Search
CPC ........ A01G 3/053; H02K 11/33; H02K 7/108; H02K 7/145; H02K 7/116; F16H 3/33
See application file for complete search history.

(56) References Cited

U.S. PATENT DOCUMENTS 1,172,343 A * 2/1916 Bullard .................. A41H 33/00
223/38
1,760,712 A * 5/1930 Morimoto ............... B26B 15/00
74/342
(Continued)

FOREIGN PATENT DOCUMENTS

CN 101720631 A 6/2010
CN 101933443 A 1/2011
(Continued)

OTHER PUBLICATIONS

TTI (Macao Commercial Offshore) Limited; International Patent Application No. PCT/CN2015/094903; International Search Report; Jun. 21, 2016; (2 pages).
(Continued)

*Primary Examiner* — Adam J Eiseman
*Assistant Examiner* — Fernando A Ayala
(74) *Attorney, Agent, or Firm* — Dority & Manning, P.A.

(57) ABSTRACT

A hedge trimmer, comprising: a drive motor disposed in a casing; a gear mechanism disposed in the casing and connected to the drive motor; and a blade arrangement having at least one cutter bar. The at least one cutter bar is driven in a reciprocating manner in a longitudinal direction of the blade arrangement by the drive motor via the gear mechanism. The gear mechanism contains at least a first gear setting and a second gear setting producing two different gear-ratios, such that the at least one cutter bar is adapted to be driven at a first speed and torque using the first gear setting, and a second speed and torque different from the first speed using the second gear setting. By providing two different trimming output modes, the hedge trimmer may provide either a high-speed/small-torque trimming capability or a low-speed/large-torque trimming capability to
(Continued)

accommodate requirements under different operation circumstances.

13 Claims, 12 Drawing Sheets

(51) Int. Cl.
*F16H 21/18* (2006.01)
*H02K 7/108* (2006.01)
*H02K 7/116* (2006.01)
*H02K 7/14* (2006.01)
*H02K 11/33* (2016.01)

(52) U.S. Cl.
CPC ............ *H02K 7/145* (2013.01); *H02K 11/33* (2016.01); *F16H 21/18* (2013.01); *F16H 2200/0034* (2013.01); *F16H 2200/2007* (2013.01); *F16H 2200/2033* (2013.01); *F16H 2200/2066* (2013.01); *F16H 2200/2082* (2013.01)

(56) References Cited

U.S. PATENT DOCUMENTS

| | | | |
|---|---|---|---|
| 2,237,433 A | 4/1941 | Hofmann, Jr. | |
| 2,330,375 A | 9/1943 | Harry | |
| 3,161,954 A * | 12/1964 | Riley, Jr. | ............... A01G 3/053 33/645 |
| 3,178,955 A * | 4/1965 | Enders | ................ B23D 49/162 74/342 |
| 3,564,938 A | 2/1971 | Hause | |
| 4,483,055 A * | 11/1984 | Sekimoto | ................ B23F 23/06 72/123 |
| 4,706,517 A | 11/1987 | Garrett | |
| 4,827,616 A * | 5/1989 | Sistare | .................. A01G 3/053 30/277.4 |
| 5,038,473 A | 8/1991 | Bradley | |
| 5,069,657 A | 12/1991 | Taniguchi | |
| 5,279,527 A | 1/1994 | Crockett | |
| 5,343,961 A * | 9/1994 | Ichikawa | .............. B25B 21/023 173/48 |
| 5,347,879 A | 9/1994 | Ordo | |
| 5,397,283 A | 3/1995 | Pratolongo | |
| 5,689,887 A | 11/1997 | Heywood | |
| 6,800,045 B1 | 10/2004 | Staver | |
| 8,444,526 B1 | 5/2013 | Schneider | |
| 9,382,998 B1 * | 7/2016 | Hart | ................... F16H 63/3026 |
| 11,185,015 B2 * | 11/2021 | Chung | ................... H02K 7/108 |
| 2003/0069103 A1 | 4/2003 | Ibamoto et al. | |
| 2008/0236332 A1 | 10/2008 | Hoose | |
| 2009/0044983 A1 | 2/2009 | Gobright, IV et al. | |
| 2009/0098971 A1 | 4/2009 | Ho | |
| 2009/0203485 A1 | 8/2009 | Bradshaw | |
| 2011/0172049 A1 | 7/2011 | Valesh | |
| 2011/0303432 A1 | 12/2011 | Stauffer | |
| 2012/0036722 A1 | 2/2012 | Hittmann | |
| 2012/0165152 A1 | 6/2012 | Tokunaga | |
| 2012/0324743 A1 | 12/2012 | Bergquist | |
| 2013/0025135 A1 * | 1/2013 | Gejervall | ............... A01G 3/053 30/216 |
| 2013/0180118 A1 | 7/2013 | Shimizu et al. | |
| 2013/0219725 A1 * | 8/2013 | Winkel | ............... B23Q 15/007 30/228 |
| 2014/0007435 A1 * | 1/2014 | Untermann | ............ A01G 3/053 30/277.4 |
| 2014/0047719 A1 * | 2/2014 | Shimizu | ................ A01G 3/053 30/216 |
| 2014/0262390 A1 | 9/2014 | Arimura et al. | |
| 2014/0318342 A1 | 10/2014 | Koegel et al. | |
| 2014/0358390 A1 | 12/2014 | Funyak et al. | |
| 2015/0075828 A1 * | 3/2015 | Herr | ....................... B25D 16/00 173/48 |
| 2015/0151447 A1 * | 6/2015 | Petersson | ............... B23D 47/12 318/722 |
| 2015/0209947 A1 | 7/2015 | Mandel et al. | |
| 2016/0075403 A1 * | 3/2016 | Yoo | ........................ B62M 11/16 475/269 |
| 2016/0330914 A1 * | 11/2016 | Tang | ....................... A01G 3/053 |
| 2017/0245857 A1 | 8/2017 | Shelton, IV et al. | |
| 2017/0246732 A1 | 8/2017 | Dey, IV et al. | |
| 2017/0366117 A1 * | 12/2017 | Cox | ........................ H02P 27/08 |
| 2018/0051783 A1 | 2/2018 | You | |

FOREIGN PATENT DOCUMENTS

| | | |
|---|---|---|
| CN | 102480920 A | 5/2012 |
| CN | 204157334 U | 2/2015 |
| EP | 0687410 A1 | 12/1995 |
| EP | 2316260 A1 | 5/2011 |
| EP | 2552188 A1 | 2/2013 |
| EP | 3331345 B1 | 6/2018 |
| JP | 2014233778 A | 12/2014 |

OTHER PUBLICATIONS

MX Office Action corresponding with Application No. MX/a/2018/006036 on Jun. 28, 2022 (1 page).

* cited by examiner

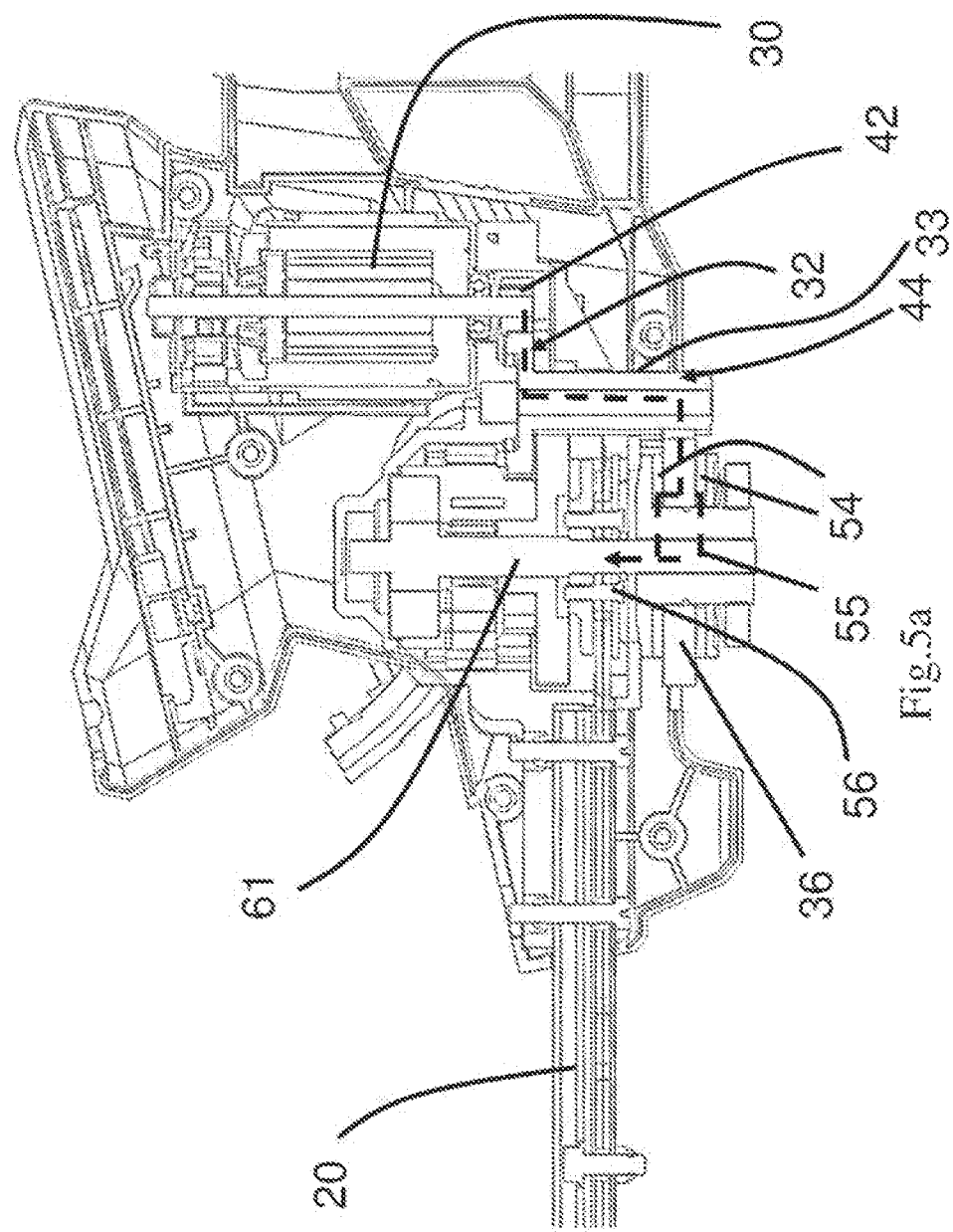

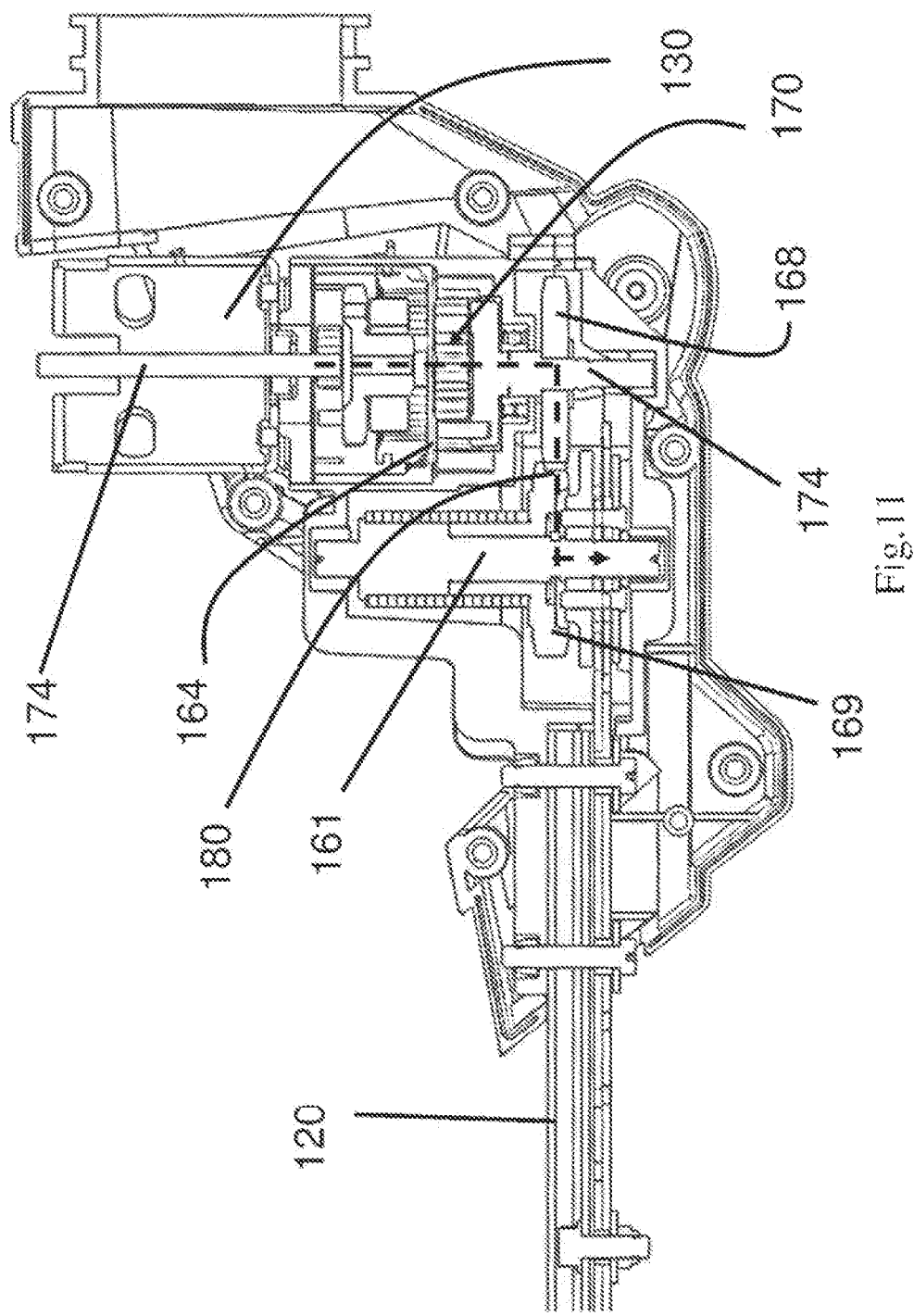

HEDGE TRIMMER

This application is a divisional of U.S. patent application Ser. No. 15/776,555, filed on May 16, 2018, which is a National Stage Patent Application of PCT/CN2015/094903, filed on Nov. 18, 2015, the disclosures of all of which are incorporated by reference herein in their entireties.

FIELD OF INVENTION

This invention relates to outdoor gardening tools, and in particular hedge trimmers used for trimming branches and leaves of a hedge or others in which a cutting blade is reciprocated by a motor.

BACKGROUND OF INVENTION

A hedge trimmer is one type of outdoor gardening tools which is used to cut off branches and leaves in, for example, desirably shaping a hedge or others by an elongated cutting blade or called cutting bar which linearly reciprocates. This cutting work is usually performed so that a worker holds the hedge trimmer with his/her both hands and moves the cutting blade along the shape of the hedge. Electric hedge trimmers are particularly popular nowadays since for holding and moving the hedge trimmer during operation, they are more light-weight and compact than internal combustion engine type hedge trimmers. To be able to cut the hedge thoroughly and steadily, the output rotational driving force from the electric motor on the hedge trimmer is usually converted to have a larger torque and lower speed, for example through a gear reduction mechanism.

However, traditional electric hedge trimmers are usually designed to have only one output rating—that is, the torque or the speed transmitted from the motor through the gear mechanism to the cutting blade are fixed to one level only. The traditional electric hedge trimmer therefore would be easily jammed for example when the user uses it to cut over grown hedges with different densities and specifies. This is because a single output torque and speed of the hedge hammer would be impossible to cater for all trimming applications. As a result, for heavy duties like trimming thicker branches the current drawn on the motor may exceed a safe level.

SUMMARY OF INVENTION

In the light of the foregoing background, it is an object of the present invention to provide an alternate hedge trimmer which eliminates or at least alleviates the above technical problems.

The above object is met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

Accordingly, the present invention, in one aspect, is A hedge trimmer, comprising: a drive motor disposed in a casing; a gear mechanism disposed in the casing and connected to the drive motor; and a blade arrangement having at least one cutter bar. The at least one cutter bar is driven in a reciprocating manner in a longitudinal direction of the blade arrangement by the drive motor via the gear mechanism. The gear mechanism contains at least a first gear setting and a second gear setting producing two different gear-ratios, such that the at least one cutter bar is adapted to be driven at a first speed and torque using the first gear setting, and a second speed and torque different from the first speed using the second gear setting.

Preferably, the gear mechanism further contains a planetary gear module which is a part of at least one of the first gear setting and the second gear setting; and an output shaft adapted to drive a drive hub of the at least one cutter bar.

In one implementation, the planetary gear module is connected between the drive motor and the output shaft. The planetary gear contains a ring gear movable along an axial direction thereof to selectively engage a first set of planet gears and a second planet gears. The first set of planet gears corresponding to the first gear setting, and the second set of planet gears corresponding to the second gear setting.

Preferably, the ring gear is mechanically connected to a manual actuator or lever which is adapted to be actuated by a user of the hedge trimmer.

More preferably, the lever is at one end connected to the ring gear, and at another end connected to a slidable switch configured on the casing which is movable between a first switch position and a second switch position. The lever is pivotable around a pivot between the two ends such that a sliding movement of the slidable switch results in a movement of the ring gear along the axial direction.

In another implementation, the second gear setting contains the planetary gear module, which at its input is connected to the drive motor and at its output is connected to the output shaft via a one-directional clutch. The first gear setting contains a friction clutch connected between the drive motor and the output shaft.

Preferably, the frictional clutch or the planetary gear module is connected to the drive motor via a gear shaft. The gear shaft has a first portion and a second portion along an axial direction of the gear shaft, with a number of teeth on the first portion different from that on the second portion.

More preferably, the number of teeth on the first portion of the gear shaft is larger than that on the second portion. The first portion engages a motor shaft of the drive motor; the second portion engaging the frictional clutch or the planetary gear module.

In one variation, the friction clutch is a friction disc set.

Preferably, the friction disc set contains two friction discs arranged concentrically. Between the friction discs a clamp gear configured of which two end faces contacting the two friction discs respectively. The clamp gear engages the drive motor and the friction discs are rotatably connected to a friction hub which is adapted to drive the output shaft. When a frictional force between the clamp gear and the friction discs is larger than a threshold, the clamping gear rotatably engaging the friction discs to transmit driving force to the output shaft. When the frictional force frictional force between the clamp gear and the friction discs is smaller than a threshold, the clamping gear rotates relative to the friction discs such that no driving force is transmitted from the clamp gear to the friction discs.

More preferably, the two friction discs and the clamp disc are kept in contact in a sandwiched way by a spring.

In another variation, the one-directional clutch is a one-directional bearing.

In a further variation, the one-directional clutch is configured such that when an output speed of the planetary gear module is smaller than the rotating speed of the output shaft, the output shaft adapted to freewheel with respect to the planetary gear module. When an output speed of the planetary gear module is larger than the rotating speed of the output shaft, the planetary gear module transmits a driving force to the output shaft.

In yet another variation, the drive motor is a brushless motor. The hedge trimmer further contains motor controller connected to the drive motor, and the motor controller is configured with a built-in motor overload protection.

In yet another variation, the drive motor is a brushed motor. The hedge trimmer further contains a battery pack in which a controller inside the battery pack is provided, so that the controller cuts off the battery power supply to the hedge trimmer if the drawn current from the battery goes over a predetermined limit.

There are many advantages to the present invention, as the hedge trimmer according to the present invention is able to provide two different output modes to meet different requirements of hedge trimming. The hedge trimmer equipped with a two speed gearbox can provide different gear ratios, either through manual gear shifting and/or automatic gear shifting, and the appropriate gear ratio will be selected according to the operation circumstance as appropriate. For example, for hedges which are soft and easy to cut, the user can select the high-speed/small-torque mode to accelerate the trimming operation by using the hedge trimmer. On the other hand, when the hedges are rigid and difficult to cut, the user can select the low-speed/large-torque mode with a higher gear ratio to generate an extra-large cutting force so that the user may conduct a continuous operation without any jamming issue. By choosing the appropriate operation mode, the hedge trimmer's motor and battery can also be effectively protected and thus prolonging their service lives.

Another advantage of the present invention is that optionally the hedge trimmer can be equipped with an automatic gear shifting module, which eliminates the need for the user to perform any manual speed selection for the purposes of different types of trimming tasks. The transition between the two operation modes in the automatic hedge trimmer is seamless and the user does not have to pause during operation to change the gear ratio. Rather, when the torque received from the cutting blade by the gear mechanism exceeds a threshold, the gear mechanism will automatically change from one force transmission path to a different force transmission path in the gear mechanism to apply a high gear ratio, thus generating an output with a large torque/low speed. When the torque received from the cutting blade then falls back to a level below the threshold, the gear mechanism consequently reverts back automatically to the low gear ratio. Such an automatic gear shifting mechanism reduces the labor intensity of the user and makes the hedge trimmer self-adapting to different working circumstances.

BRIEF DESCRIPTION OF FIGURES

The foregoing and further features of the present invention will be apparent from the following description of preferred embodiments which are provided by way of example only in connection with the accompanying figures, of which:

FIG. 5a shows the driving force transmission path in the gear mechanism of FIGS. 2-4 when a high-speed/small-torque output mode is selected.

FIG. 11 shows the driving force transmission path in the gear mechanism of FIGS. 8-10.

In the drawings, like numerals indicate like parts throughout the several embodiments described herein.

DETAILED DESCRIPTION OF THE PREFERRED EMBODIMENTS

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Terms such as "horizontal", "vertical", "upwards", "downwards", "above", "below" and similar terms as used herein are for the purpose of describing the invention in its normal in-use orientation and are not intended to limit the invention to any particular orientation.

Figure 1:
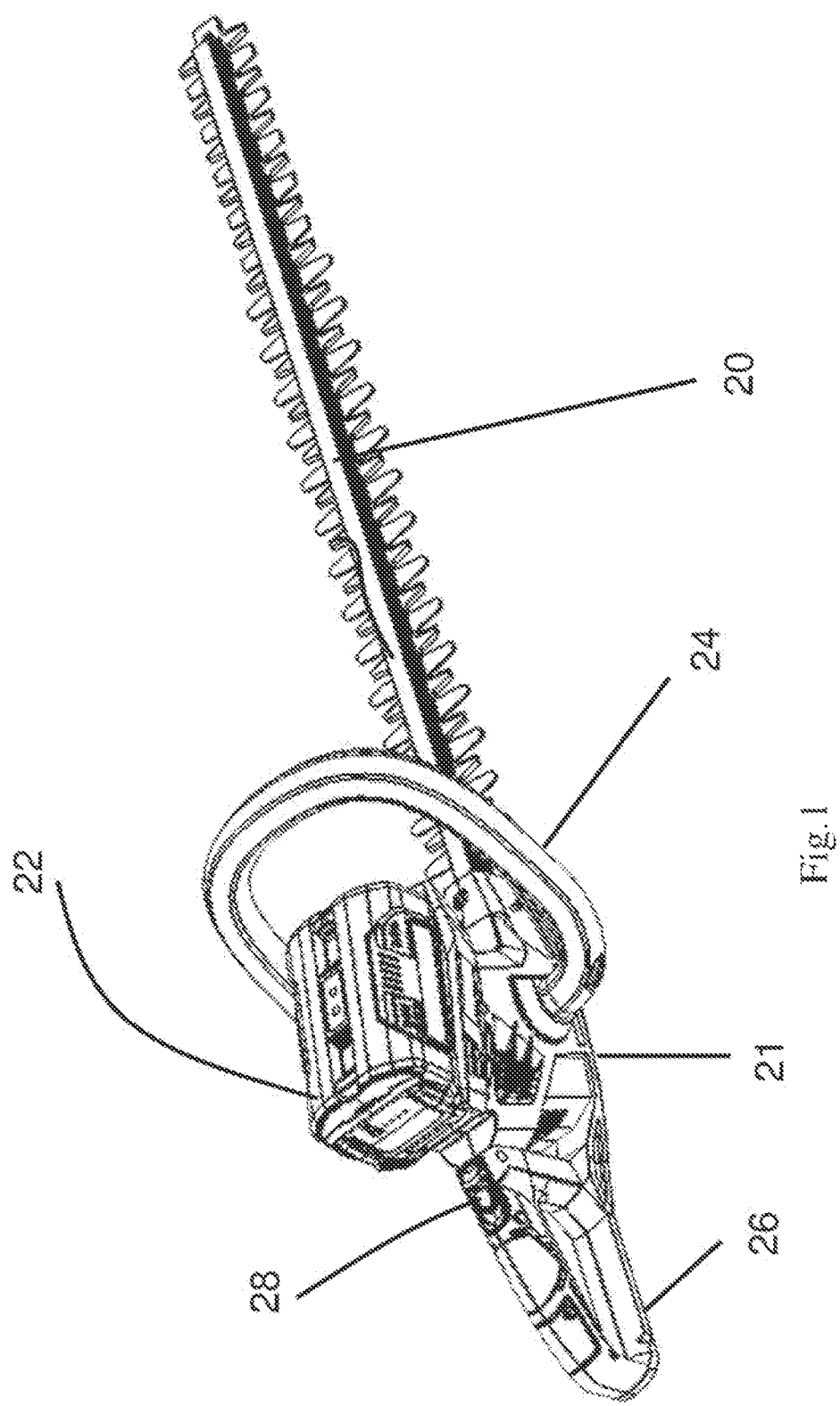
FIG. 1 is a perspective view of the overall appearance of a hedge trimmer according to one embodiment of the present invention.

Referring now to FIG. 1, the first embodiment of the present invention is a hedge trimmer configured with an automatic gear shifting mechanism. The hedge trimmer includes a casing 21, and a blade arrangement having cutter bars 20 which are driven in a reciprocating manner in a longitudinal direction of the blade arrangement by a drive motor (not shown) disposed in the casing 21. The cutting bars 20 are made typically of metal in the form of cutting blades. A gear mechanism (not shown) is also placed within the casing 21 and connected between the drive motor and the cutting bars 20, which will be described in more details later. The casing 21 is connected with two handles, which are a front handle 24 and a rear handle 26 for the user to hold and operate the hedge trimmer in a convenient way, as skilled persons would appreciate. A removable battery pack 22 is attached to the hedge trimmer at the top of the casing 21. On the rear handle 26, there is a power switch 28 which control the power supply to parts in the hedge trimmer like the drive motor. A trigger (not shown) is also configured on the rear handle for the user to activate on a real-time basis the drive motor so that the motor only rotates when the user keeps pressing the trigger.

Figure 2:
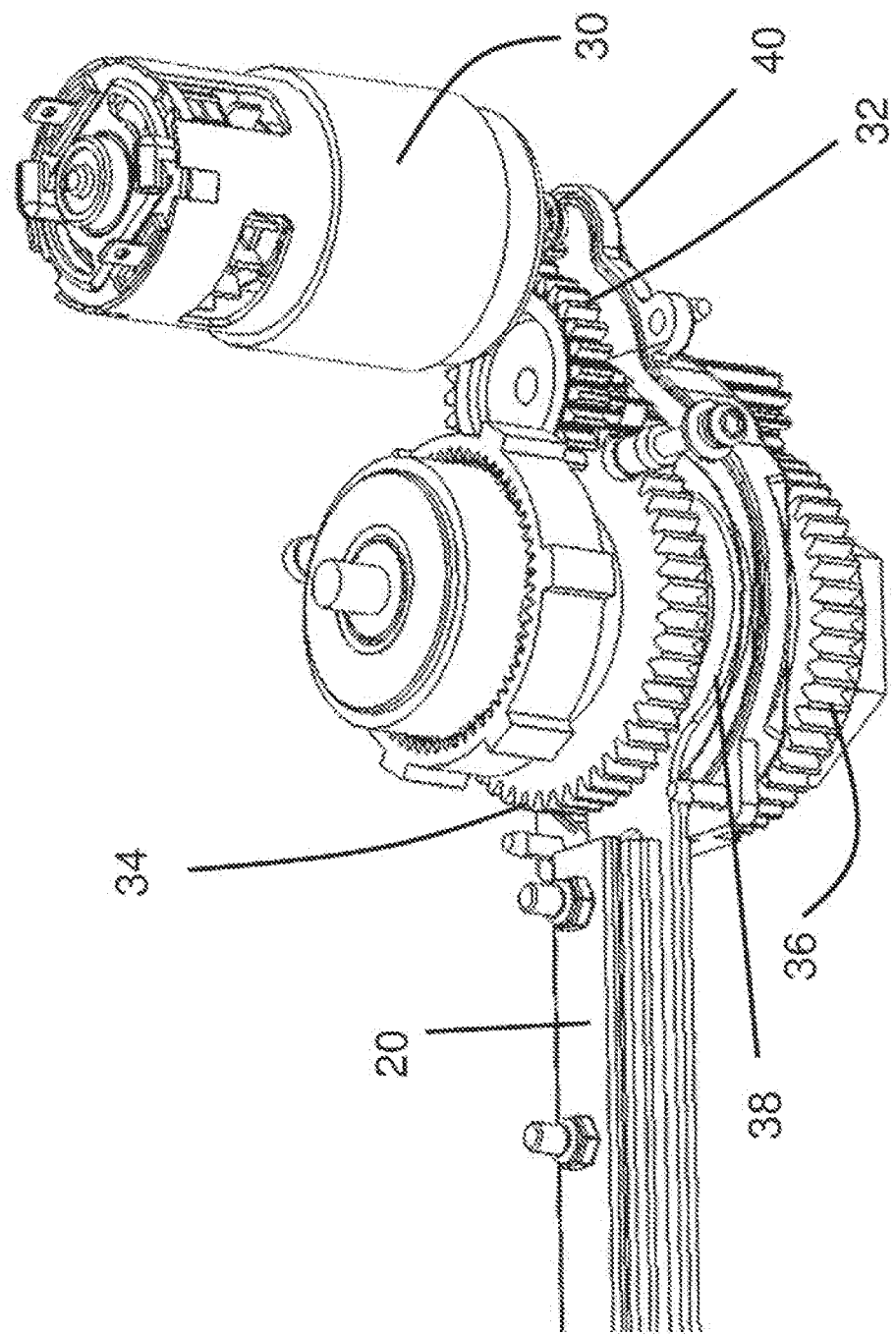
FIG. 2 shows the perspective view of the internal gear mechanism and electric motor of the hedge trimmer in FIG. 1.
Figure 3:
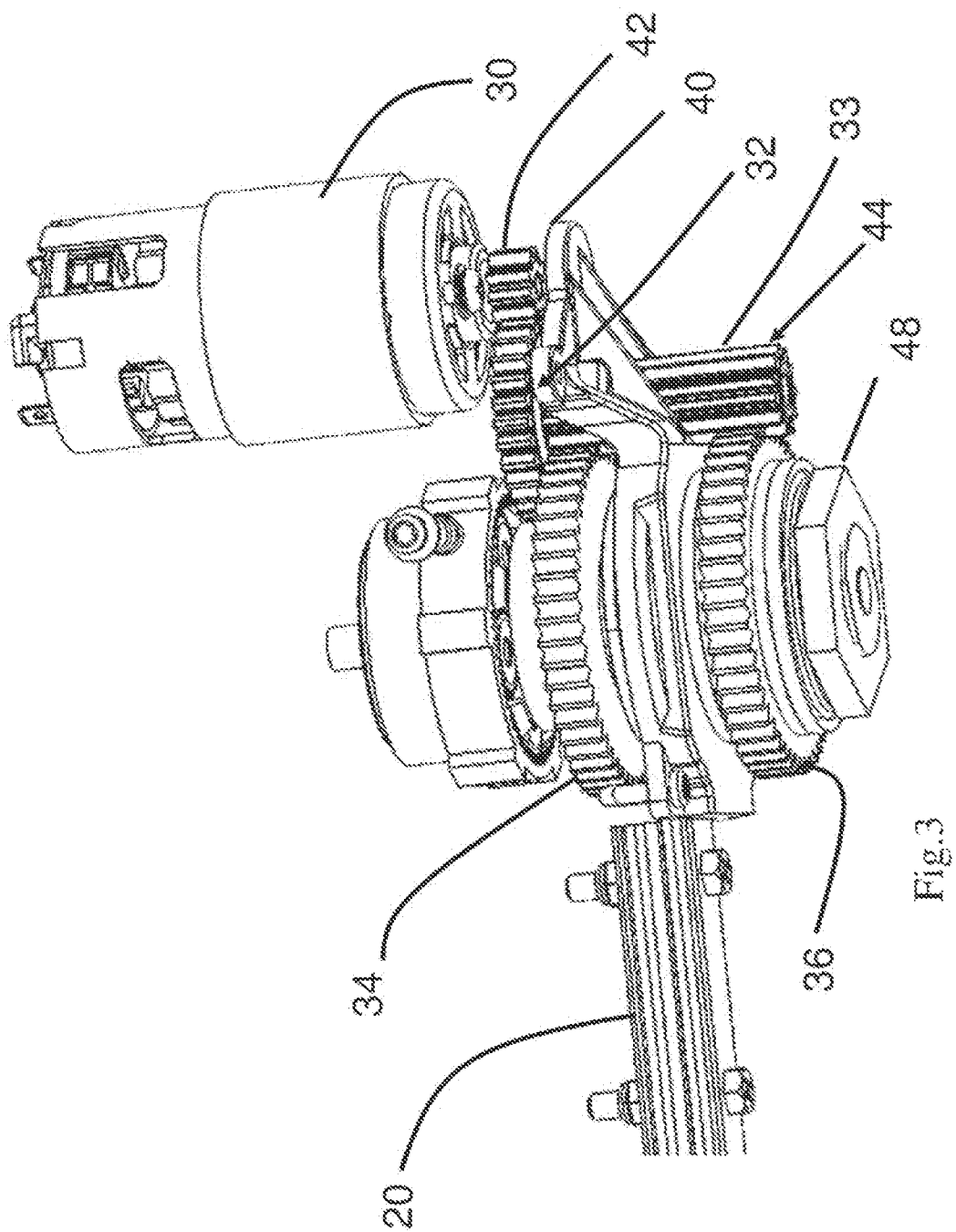
FIG. 3 shows the internal gear mechanism and electric motor of the hedge trimmer in FIG. 1 from another angle.

Turning now to FIGS. 2-3, in the hedge trimmer shown in FIG. 1 the gear mechanism is arranged to convert and deliver driving force outputted by the drive motor 30 to the cutting bars 20. As skilled persons would appreciate, the cutting bars 20 have on their one end an eccentric gear 38 which is adapted to be driven by a drive hub (not shown) so that a rotational movement of the drive hub will be converted to a reciprocal movement of the cutting bars 20 along a straight line direction. A clamp gear 36 and a planet gear carrier 34 which are arranged concentrically both engage a gear shaft 33, but at different positions of the gear shaft 33. The clamp gear 36 and the planet gear carrier 34 are responsible for two different driving force transmission paths respectively, as will be described in more details later. There is also an adjusting nut 48 located at the bottom of the clamp gear 36.

The gear shaft 33 has its rotating axis offset from those of the drive motor 30, clamp gear 36 and the planet gear carrier 34. The gear shaft 33 contains two portions, i.e. a first portion 32 with a larger diameter but a smaller length along the axial direction of the gear shaft 33, and a second portion 44 with a smaller diameter but a larger length along the axial direction as compared to the first portion 32. The first portion 32 engages a motor gear 42 which is fixedly connected to the output shaft (not shown) of the drive motor 30. On the other hand, the second portion 44 engages the clamp gear 36 and the planet gear carrier 34 at two different meshing points. The meshing point between the clamp gear 36 and the gear shaft 33 is at an end of the second portion 44 away from the first portion 32. The meshing point between the planet gear carrier 34 and the gear shaft 33 is at an end of the second portion 44 adjacent to the first portion 32. The whole gear mechanism is supported by a gearbox support 40 which supports the gear mechanism on the casing of the hedge trimmer (not shown).

Figure 4:
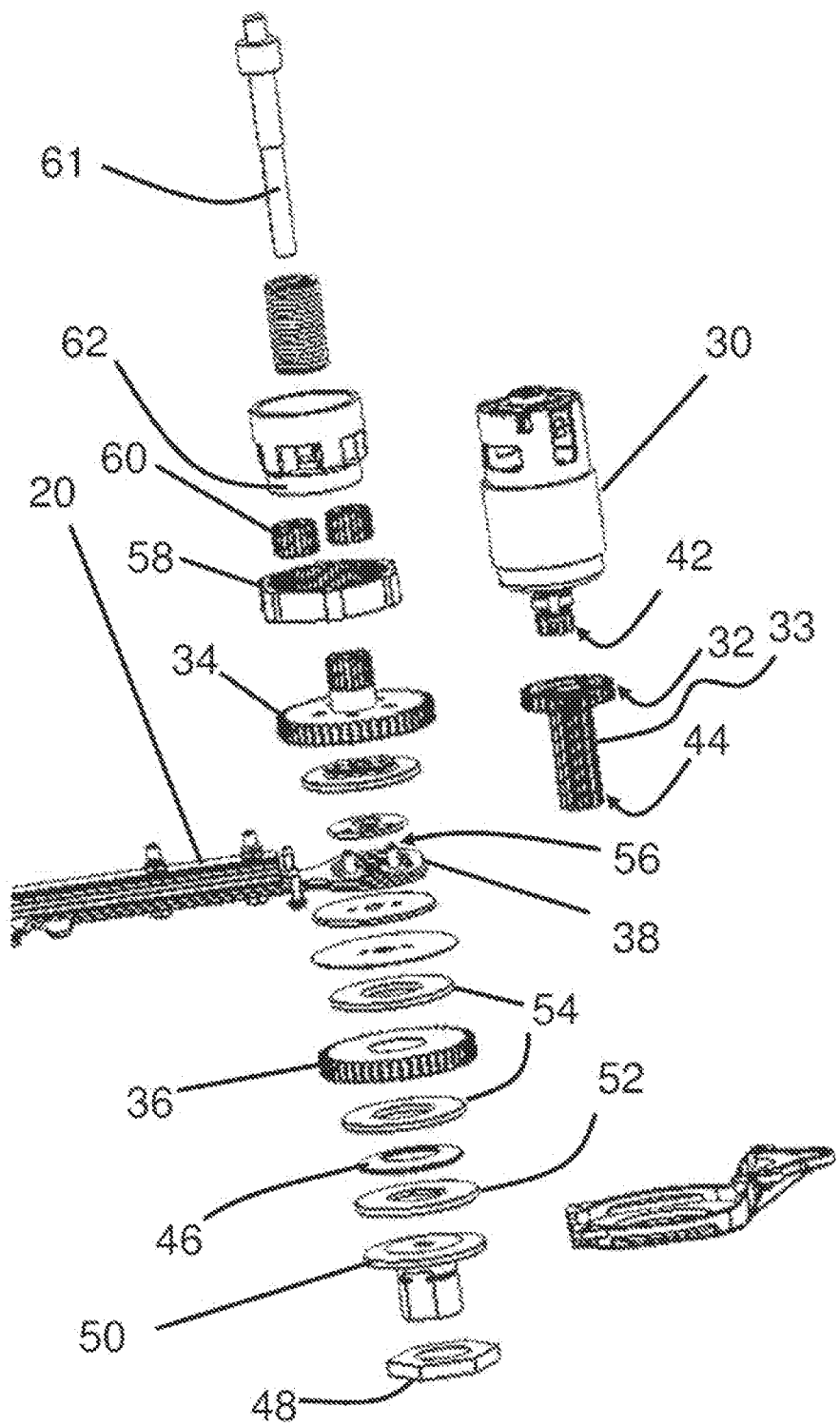
FIG. 4 is an exploded view of the gear mechanism of the hedge trimmer in FIG. 1.

FIG. 4 shows an exploded view of the gear mechanism described above. There is an output shaft 61 which rotates around an axis parallel to that of the motor shaft axis of the drive motor 30 and that of the gear shaft 33. As mentioned above the output shaft 61 is adapted to drive a drive hub 56 to convert the rotational driving force generated by the drive motor 30 to a reciprocating movement of the cutting bars 20. There are two gear settings in the gear mechanism, and they are based on a friction clutch, and a one-directional clutch with a planetary gear module respectively.

In particular, the first gear setting, which is intended to provide a high-speed/small-torque output, is realized by a friction clutch. The friction clutch includes a friction disc set, which contains the clamp gear 36, and two friction discs 54. The gear shaft 33 engages the clamp gear 36, which is placed between the two friction discs 54 in a sandwiched way. The clamp gear 36 and the two friction discs 54 are all configured concentrically around the output shaft 61. Below the friction disc 54 there are a spring plate 46, a clamp plate 52, a friction hub 50, and the adjusting nut 48 configured in sequence. The friction discs 54 are biased by the spring plate 46 to clamp the clamp gear 36 and a friction is created between the two faces of the clamp gear 36 and their corresponding friction discs 54. In other words, the spring plate 46 acts like a spring. The friction hub 50 is driven by the rotation of the friction discs 54, but on the other side is adapted to drive the output shaft 61 to rotate as the friction hub 50 and the output shaft 61 are running fitted.

On the other side, above the drive hub 56 there is a second gear setting realized by a one-directional clutch in the form of a one-directional bearing 62, and a planetary gear module. The second gear setting is intended to provide a low-speed/large-torque output, as opposite to the first gear setting above. The planetary gear module contains the planet gear carrier 34, a plurality of planet gears 60, and a ring gear 58. These components of the planetary gear module are connected and interactively function to provide a gear reduction ratio, as skilled persons would appreciate. Thus, the internal structure of the planetary gear module will not be described in details here. The output of the planetary gear module, as provided by the ring gear 58, is transmitted to the one-directional bearing 62. The output of the one-directional bearing 62 is connected to the output shaft 61 to drive the latter to rotate.

Now turning to the operation of the device described above, FIGS. 5*a*-5*b* show how the device according to the present invention may be working under either the high-speed/small-torque output mode, or the large-torque/low-speed output mode, and that such mode change is done automatically by the gear mechanism described without the need for human intervention. During operation, the drive motor 30 will be activated when both the power switch of the hedge trimmer is turned on, and that the user presses down the trigger (the power switch and the trigger are not shown here). The drive motor 30 when energized outputs a rotational driving force at the motor gear 42. Next the motor gear 42 drives the gear shaft 33 as these two engage each other. In particular, the motor gear 42 engages the first portion 32 of the gear shaft 33, and since the motor gear 42 has less number of teeth than the first portion 32, the gear shaft 33 is driven by the drive motor 30 to rotate at a lower angular speed but at the same time at a larger torque than the motor gear 42. The second portion 44 of the gear shaft 33 rotates at the same angular speed as first portion 32. The second portion 44 further engages both the planet gear carrier 34 and the clamp gear 36, and therefore drives them to rotate at the same time. Again, as the second portion 44 has less number of teeth than either the planet gear carrier 34 or the clamp gear 36, the planet gear carrier 34 and the clamp gear 36 are driven to rotate at a lower angular speed but at the same time at a larger torque than the second portion 44 of the gear shaft 33. One can see that through the gear meshing from the drive motor 30 to the planet gear carrier 34 and the clamp gear 36, the rotational driving force has already been converted to have a lower speed but larger torque compared to the raw motor output from the drive motor 30.

Next, as the driving force is transmitted to both the planet gear carrier 34 and the clamp gear 36, the first and second speed settings described above are both able to further transmit the driving force to the output shaft 61. However, only one of the first and second speed settings will be used to transmit the rotational power to the output shaft 61 at a time, and this is automatically switched by the gear mechanism according to the torque received from the cutting bars 20. FIG. 5*a* shows the hedge trimmer operating in a high-speed/small-torque mode, where the driving force is transmitted through a path along the first gear setting. The hedge trimmer operates in the high-speed/small-torque mode since the torque received from the cutting bars 20 is lower than a predetermined threshold. In particular, as the clamp gear 36 is driven to rotate by the gear shaft 33, the clamp gear 36 attempts to create relative movement to the friction discs 54. However, because the cutting bars 20 is not stopped by a hedge or became jammed for example, the static frictional force between the clamp gear 36 and the friction discs 54 is high enough to drive the friction discs 54 to move together with the clamp gear 36. Rotation of the friction discs 54 drives the friction hub (not shown) to rotate, which then drives the output shaft 61 and the drive hub 56 in turn to rotate. The drive hub 56 rotates to driving the cutting bars 20 to move in a reciprocating manner due to the eccentric gears (not shown) at the end of the cutting bars 20, as previously described. The hedge trimmer then works in a high-speed/small-torque mode which is adapted to cut thin branches and grass, for example.

Note that at the time the output shaft 61 is driven by the friction hub, the planetary gear module in the second gear setting is also be driven to rotate, since it is described above that the clamp gear 36 and the planet gear carrier 34 are always driven by the gear shaft 33 at the same time. However, the output of the planetary gear module in the second gear setting has a lower angular speed but larger torque than the output of the friction hub in the first gear setting, since the planet gear module inherently provides a gear reduction ratio, where the friction disc set does not provide such a high gear reduction ratio. As a result, the one-directional bearing 62 has its input and output parts (not shown) both rotating where the output part is driven by the output shaft 61, and the input part is driven by the planetary gear module. However, the one-directional bearing 62 allows the output part to freewheel in this case irrespective of the driving force from the input part since the output part rotates at a speed higher than the input part. In other words, in this case the driving force in the one-directional bearing 62 is not transmitted from the input part to the output part. As a result, the driving force from the drive motor 30 is not transmitted to the output shaft 61 via the second gear setting (due to the one-directional bearing 62), but instead the driving force is transmitted to the output shaft 61 only via the first gear setting (i.e. through the friction clutch). The driving force transmission path in this high-speed/small-torque mode is indicated by arrow 55.

Figure 5B:
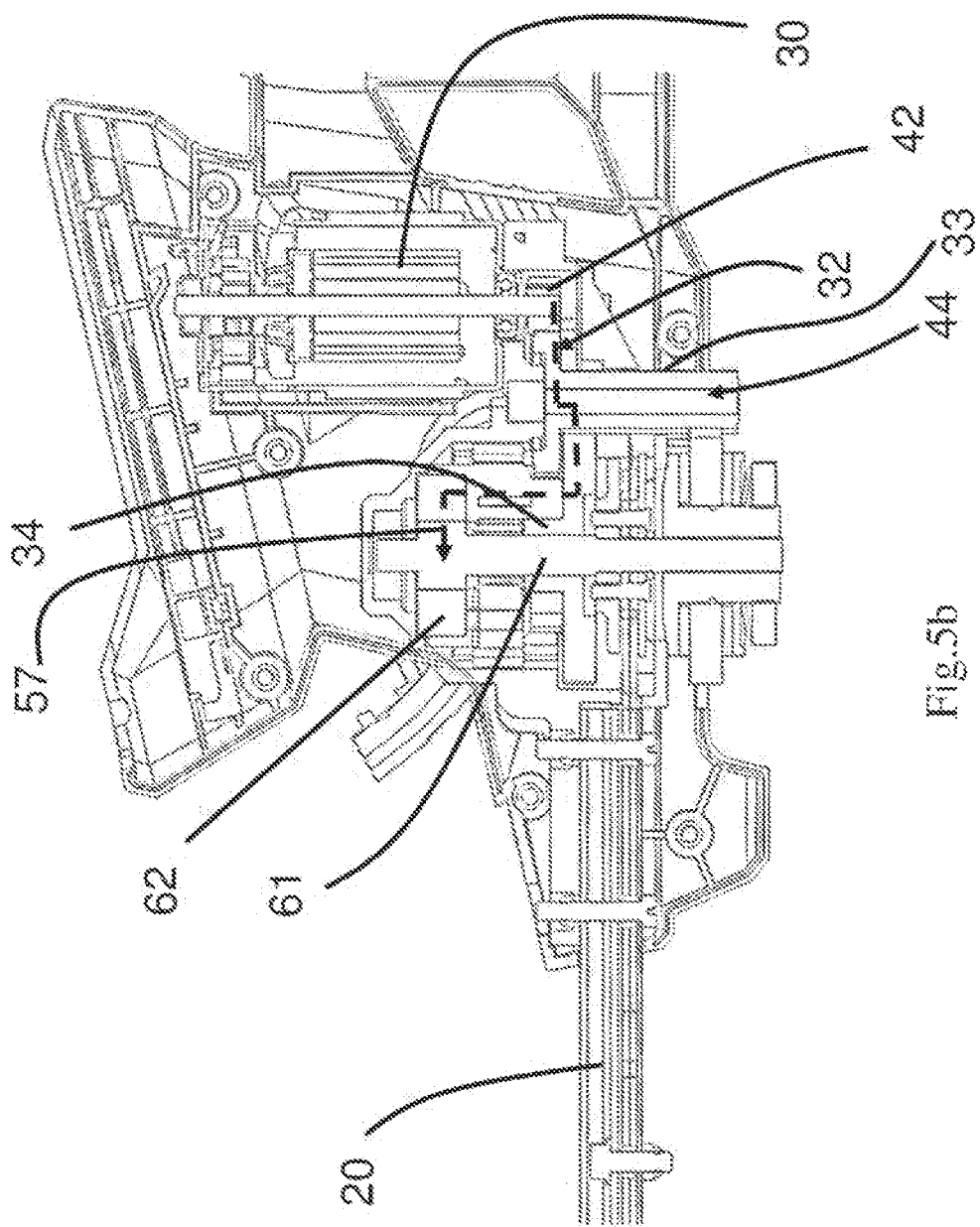
FIG. 5b shows the driving force transmission path in the gear mechanism of FIGS. 2-4 when a low-speed/large-torque output mode is selected.

However, if during the hedge trimming operation the cutting bars 20 encounters thick branches, then an increased torque received from the cutting bars 20 will function to make the gear mechanism change its gear setting to the second gear setting. Turning to FIG. 5b, if the cutting bars 20 receive a high torque which exceeds the predetermined threshold mentioned above, then the static frictional force between clamp gear 36 and the friction discs 54 is not be enough to drive the friction discs 54 any longer. Rather, the clamp gear 36 starts to rotate relative to the friction discs 54, and that the friction discs 54 are not driven by the clamp gear 36 any more in this case. At the same time, the driving force through the planetary gear module keeps outputting with a large torque and a low speed to the one-directional bearing 62. Even if this output is with a large torque and a low speed, it drives the input part of the one-directional bearing 62 to rotate faster than the output part of the one-directional bearing 62 which as connected to the output shaft 61 does not receive any other driving force. Consequently, the one-directional bearing 62 is now in a status where the input part drives the output part to rotate at the same speed. The one-directional bearing 62 now functions to transmit the driving force from the output of the planetary gear module to the output shaft 61. The output shaft 61 then rotates in a large-torque/low-speed status as compared to the previous status when the hedge trimmer is in the high-speed/small-torque mode. On the other hand, as the friction clutch now is not mechanically connected (due to the relative rotation between the friction discs 54 and the clamp gear 36), the rotation of the output shaft 61 does not affect the clamp gear 36 along a reverse direction. The hedge trimmer now works in a large-torque/low-speed mode which is adapted to cut thicker branches and grass, for example. The driving force transmission path in this high speed low torque mode is indicated by arrow 57.

When the torque received from cutting bars 20 drops to a level below the predetermined threshold again, then the hedge trimmer will return to the high speed low torque driving mode automatically by the friction clutch regains its role in constituting the driving force transmission path, under a switching principle similar to that described above.

Figure 6:
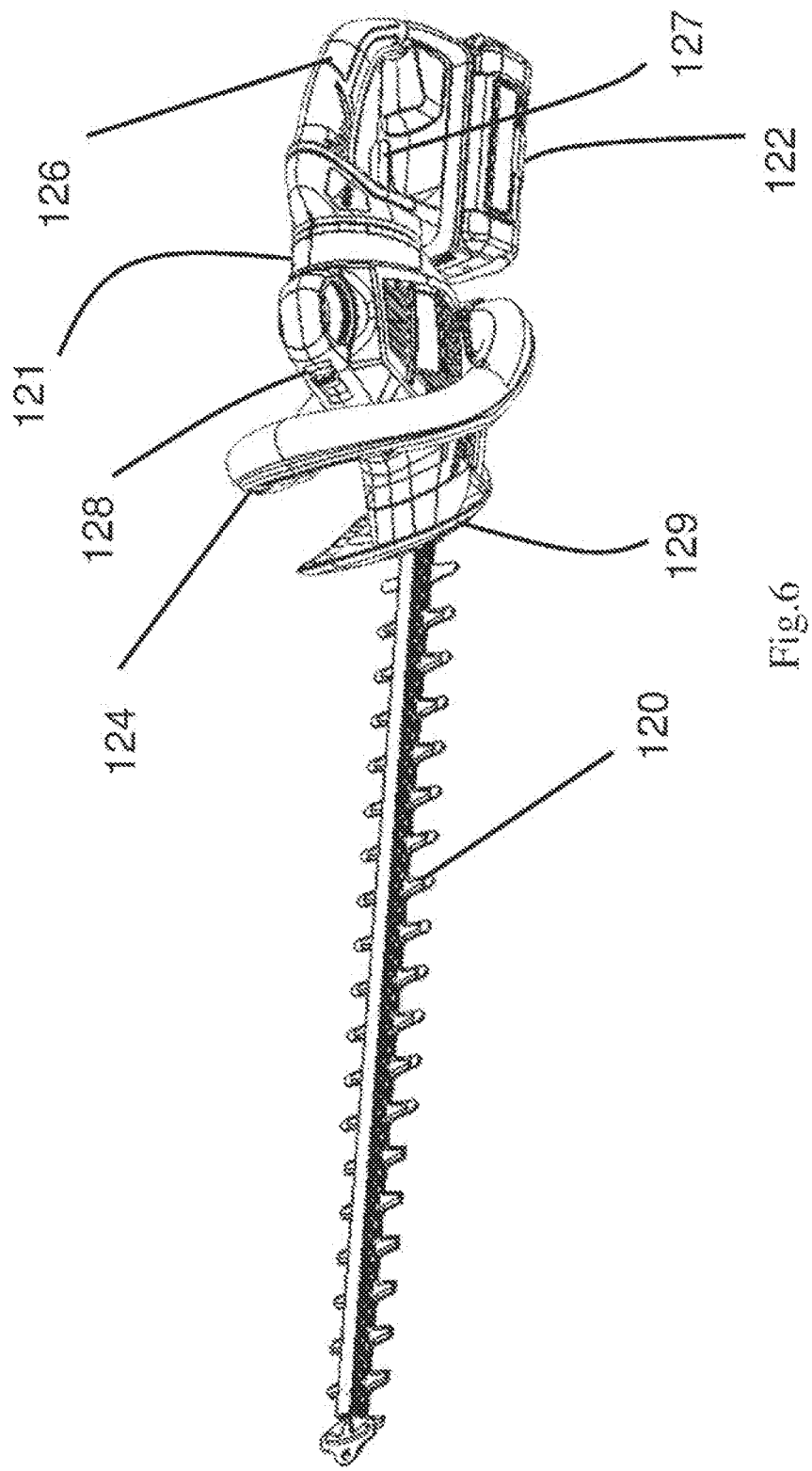
FIG. 6 is a perspective view of the overall appearance of a hedge trimmer according to another embodiment of the present invention.

Turning now to FIG. 6, which shows a hedge trimmer according to a second embodiment of the present invention. Compared to the hedge trimmer described in FIGS. 1-5b, the hedge trimmer in FIG. 6 does not have an automatic gear-ratio changing mechanism. Rather, the hedge trimmer in FIG. 6 relies on the user to manually select the desired output mode. In FIG. 6, the hedge trimmer includes a casing 121, and a blade arrangement having cutter bars 120 which driven in a reciprocating manner in a longitudinal direction of the blade arrangement by a drive motor (not shown) disposed in the casing 121. A gear mechanism (not shown) is also placed within the casing 121 and connected between the drive motor and the cutting bars 120, which will be described in more details later. The casing 121 is connected with two handles, that is a front handle 124 and a rear handle 126 for the user to hold and operate the hedge trimmer as skilled persons would appreciate. A removable battery pack 122 is attached to the hedge trimmer at the bottom of the rear handle 122. A shroud 129 is provided in front of the casing 121 to provide protection to the user during trimming operation. On the casing 121, there is a mode switch 128 that controls the output mode of the hedge trimmer, which will be described in more details below. The mode switch 128 is slidable by the user's finger operation. A trigger 127 is also configured on the rear handle 126 for the user to activate on a real-time basis the drive motor so that the motor only rotates when the user keeps pressing the trigger 127.

Figure 7:
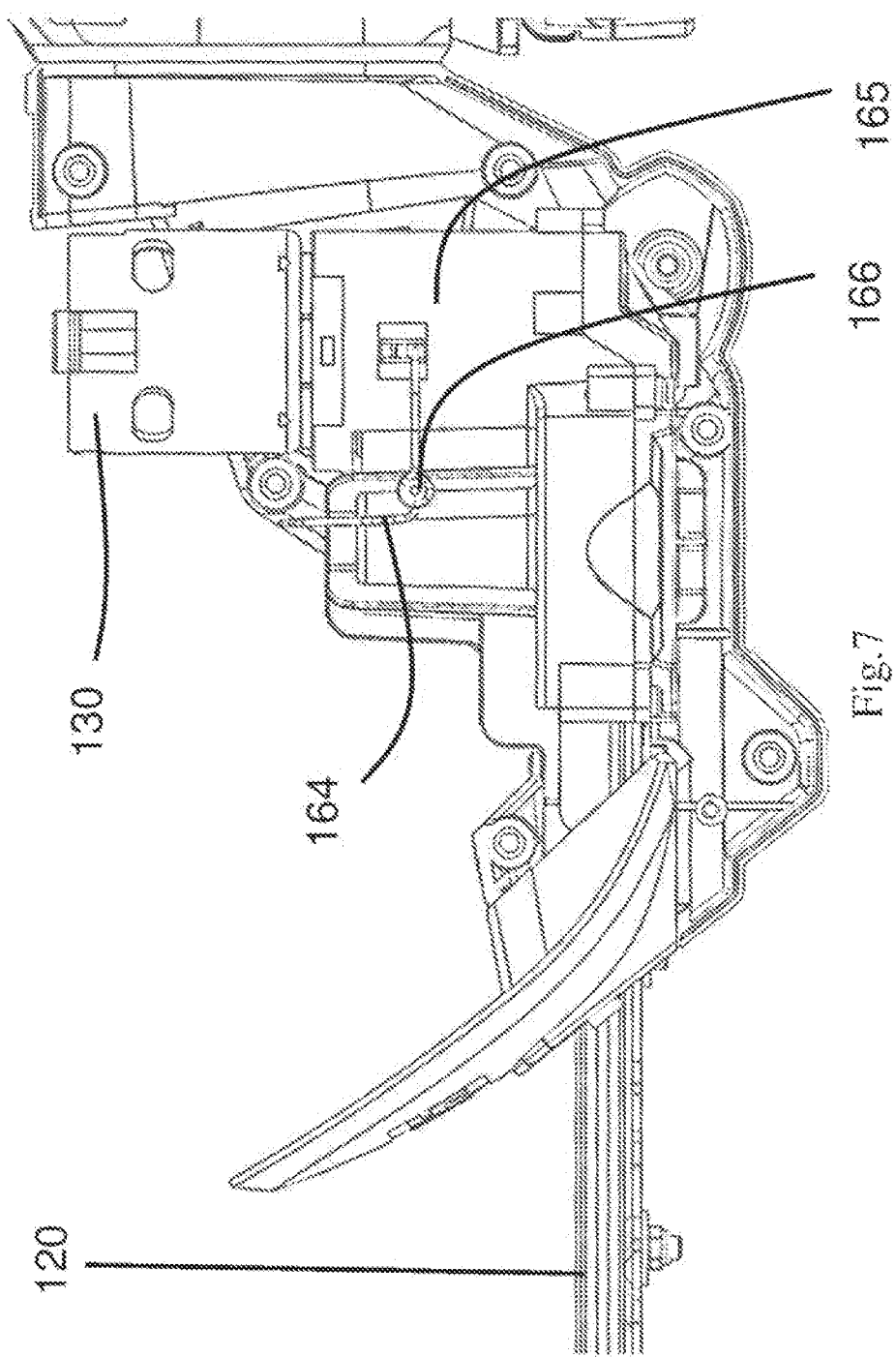
FIG. 7 is a side view of the hedge trimmer in FIG. 6 with its casing removed to reveal the gear box and the drive motor.

Turning now to FIG. 7, in the hedge trimmer a mechanical lever is equipped to allow the user to manually switch the gear reduction ratio of the gear mechanism of the hedge trimmer. This is achieved by a lever 164 connected between the mode switch (not shown in FIG. 7) and the ring gear (not shown) of the planetary gear module in the gear mechanism. The gear mechanism is covered by a gearbox housing 165, and the gear mechanism is connected to a drive motor 130. In particular, the planetary gear module is directly coupled to and driven by the motor shaft 173 of the drive motor 130. The lever 164 has a substantially "L" shape when looking from the side. The lever 164 is hinged around a pivot 166 adjacent to the right angle corner of the "L" shape. The pivot 166 is formed on the gear box housing 165. One end of the lever 164 is fixedly connected to the mode switch and the other end is fixedly connected to an exterior face of the ring gear.

Figure 8:
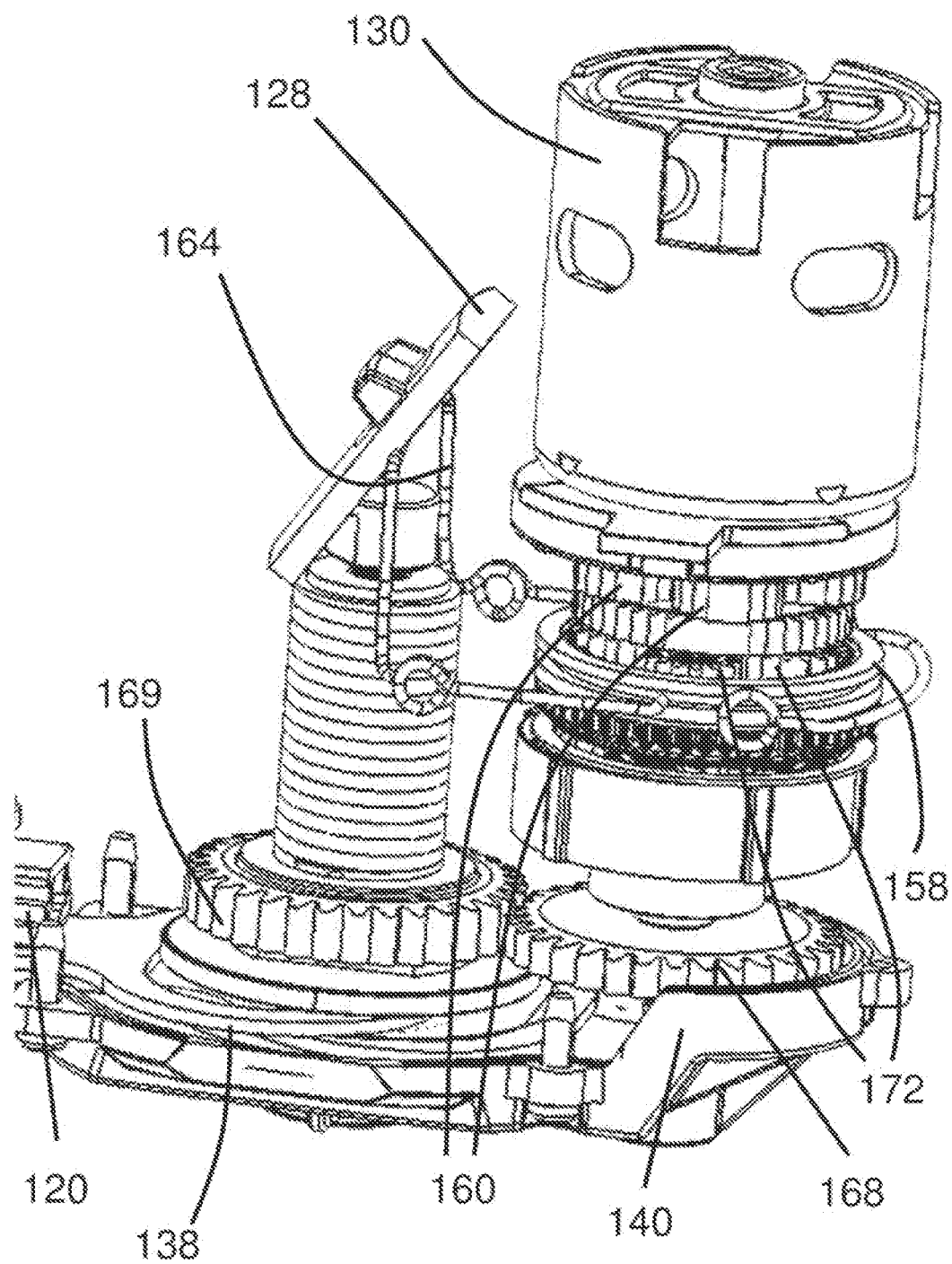
FIG. 8 shows the perspective view of the internal gear mechanism and electric motor of the hedge trimmer in FIG. 6.

Turning now to FIG. 8, in the hedge trimmer shown in FIG. 6 the gear mechanism is arranged to convert and deliver driving force outputted by the drive motor 130 to the cutting bars 120. As skilled persons would appreciate, the cutting bars 120 have on their one end an eccentric gear 138 which is adapted to be driven by a drive hub (not shown) so that a rotational movement of the drive hub will be converted to a reciprocal movement of the cutting bars 120 along a straight line direction.

Figure 9:
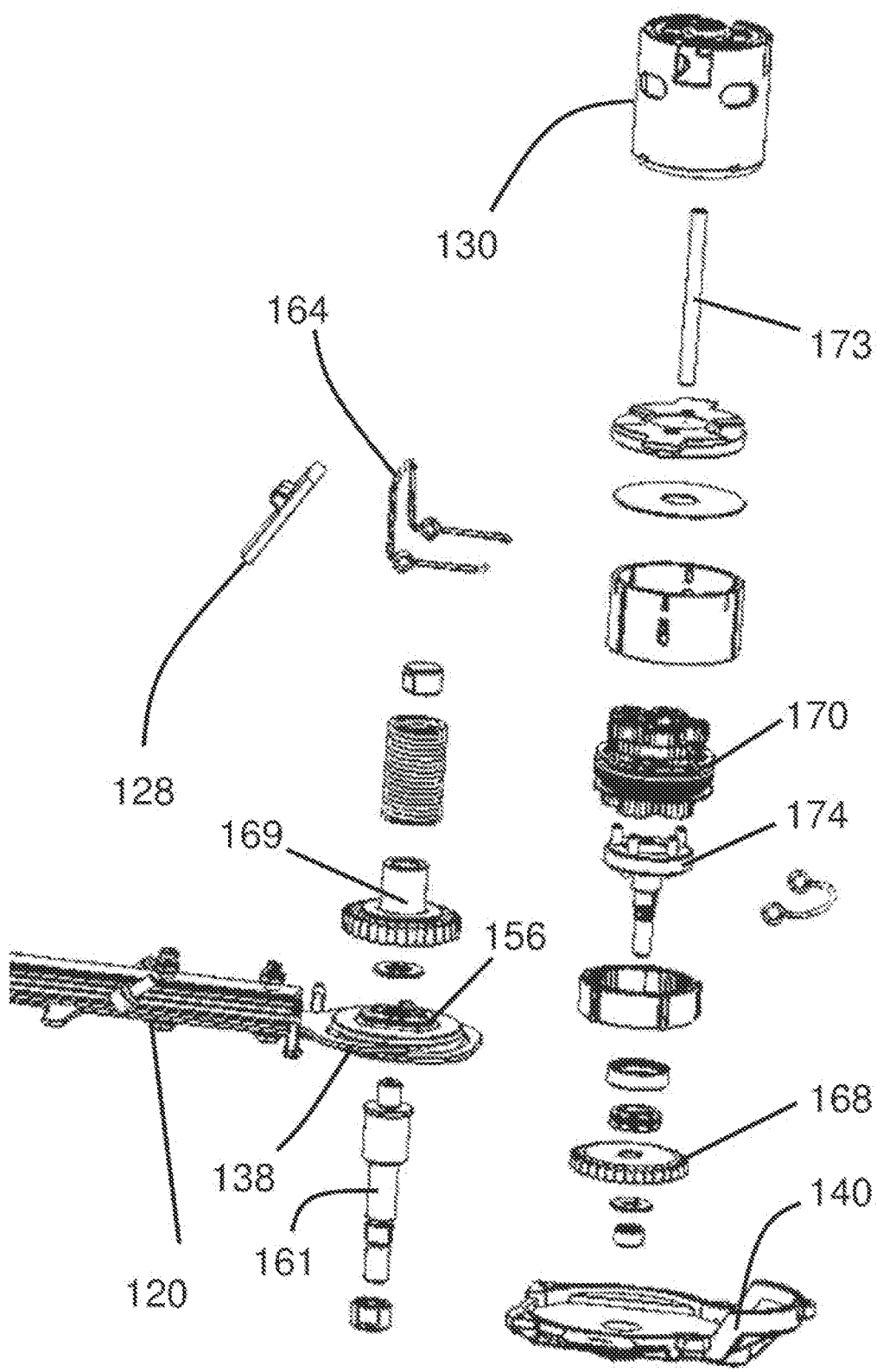
FIG. 9 is an exploded view of the gear mechanism of the hedge trimmer in FIG. 6.

FIGS. 8-9 show the gear mechanism of the above hedge trimmer in details, in which FIG. 8 shows the gear mechanism with the gearbox housing removed to reveal the internal parts. The gear mechanism is supported by the gearbox support 140 on the casing (not shown) of the hedge trimmer. The drive motor 130 is connected to the a planetary gear module 170 containing a ring gear 158, a first set of planet gears 160, a second set of planetary gears 172, and a planetary gear carrier 174. The ring gear 158 is designed to be movable along the axial direction of the motor shaft 173 as a result of the pivoting movement of the lever 164 due to the sliding movement of the switch 128, so that the ring gear 158 can selectively engages with the first set of planet gears 160 or the second set of planetary gears 172. The output of the planetary gear module 170 is connected to an output gear 168 which is fixedly connected to and drivable by the planetary gear carrier 174. The output gear 168 further engages with an input gear 169. The input gear 169 is fixedly connected to an output shaft 161 which rotates around an axis parallel to that of the motor shaft 173 of the drive motor 130. As mentioned above, the output shaft 161 is adapted to drive a drive hub 156 to convert the rotational driving force to a reciprocating movement of the cutting bars 120.

Figure 10:
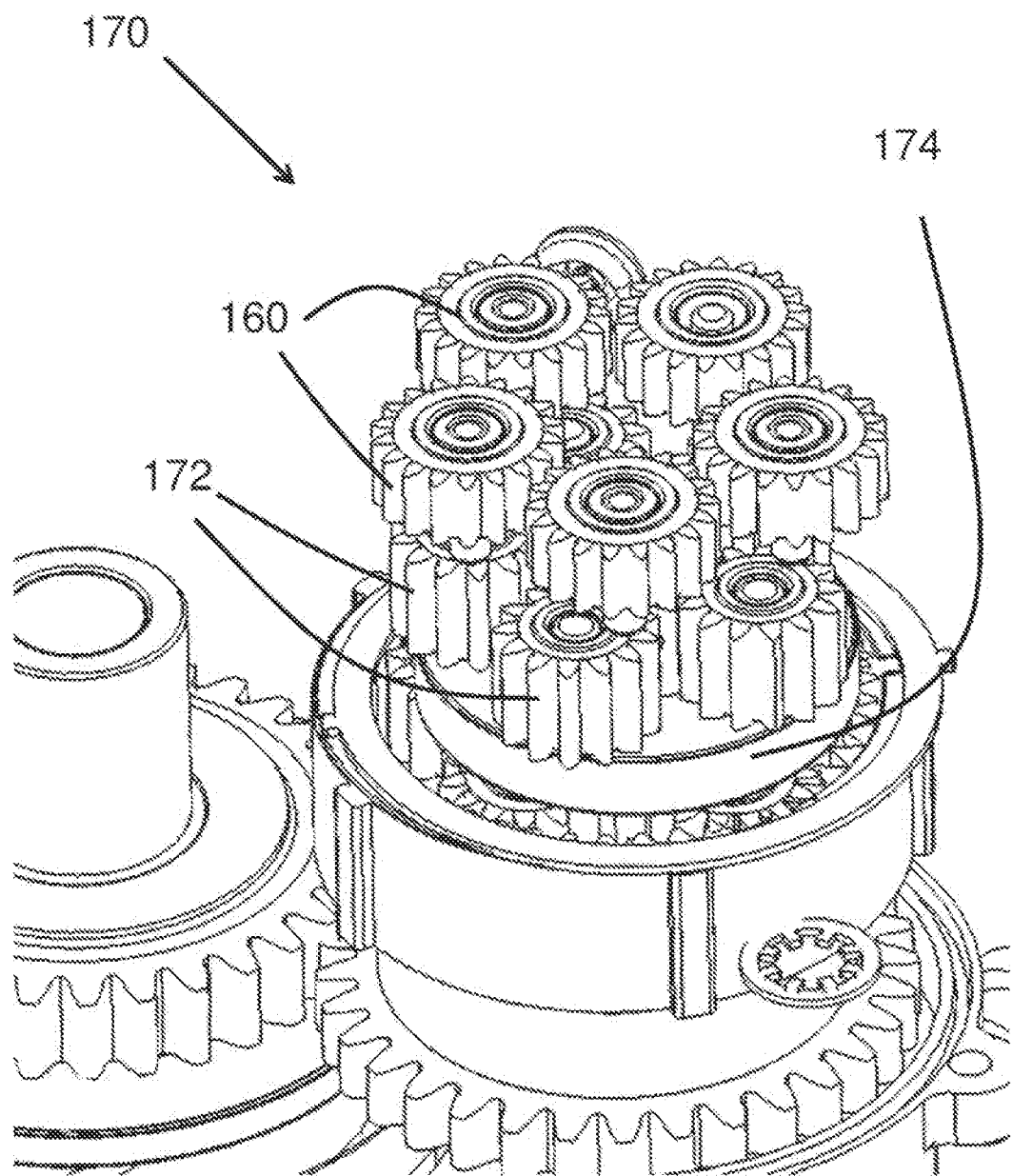
FIG. 10 is a detailed perspective view of the planetary gear module of the gear mechanism in FIG. 9 with the ring gear omitted.

FIG. 10 shows the internal structure of the planetary gear module 170 in FIG. 9, and in particular shows the first set of planet gears 160 and the second set of planetary gears 172 with the housing of the planetary gear module 170 removed. There are five planet gears in each of the first set of planet gears 160 and the second set of planetary gears 172, but the number of teeth on each planet gear differs between the first set of planet gears 160 and the second set of planetary gears 172. As shown in FIG. 10, a planet gear in the first set of planet gears 160 has 18 teeth, but a planetary gear in the second set of planet gears 172 only has 13 teeth. The five planet gears in the first set of planet gears 160 are arranged at an offset on the axial direction from the five planet gears in the second set of planetary gears 172.

Now turning to the operation of the device described above, FIG. 11 shows how the device according to the second embodiment may be working under either the high-speed/small-torque output mode, or the large-torque/low-speed output mode. During operation, the drive motor 30 will be activated when both the user presses the trigger (not shown), which then drives the planetary gear module 170 directly. The gear reduction ratio achieved by the planetary gear module 170 however depends on the position of the ring gear 158. As mentioned above, the lever 164 operates to shift the ring gear 158 to move between two positions along the axial direction of the motor shaft 173. This movement is made by the user manipulating the mode switch (not shown) on the hedge trimmer casing as described above. The mode switch can only be moved to the two allowed positions by sliding, and this means that the ring gear 158 can only engage either with the first set of planet gears 160 or the second set of planetary gears 172, but is not allowed engage none of the planet gears (that is, a neutral position of the ring gear 158 is not allowed). Depends on the selection of the user, the ring gear 158 engages with the first set of planet gears 160 or the second set of planetary gears 172 to provide different outputs. Since the planet gear in the first set of planet gears 160 has more teeth than that in the second set of planetary gears 172, when the ring gear 158 engages with the first set of planet gears 160 the output of the planetary gear module 170 will have a higher angular speed and smaller torque than the case when the ring gear 158 engages with second set of planetary gears 172. In either mode, the output of the planetary gear module 170 is transmitted to the output gear 168 which is fixed to the planet gear carrier 174. The output gear 168 then drives the input gear 169 and, the output shaft 161 in turn. The output shaft 161 then drives the drive hub (not shown) to rotate, which enables the cutting bars 120 to move in a reciprocating manner due to the eccentric gears (not shown) at the end of the cutting bars 120. Therefore, depending on the actual requirements, for example whether the branches are thick or thin, the user may manipulate the mode switch to change the output of the hedge trimmer in a high speed low torque mode, or a high torque low speed mode. The driving force transmission path in this embodiment is indicated by the arrow 180 in FIG. 11.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

It is to be understood that, if any prior art publication is referred to herein, such reference does not constitute an admission that the publication forms a part of the common general knowledge in the art, in Australia or any other country.

For example, in the specific embodiments described above the definite articles "first" and "second" are used in different instances to indicate different modes/modules in the hedge trimmer for the sake of easy description of the embodiments. However, those skilled in the art should appreciate that the use of "first" and "second" does not intend to limit the designated modes/modules/parts to a specific configuration or function. Rather, the words "first" and "second" or any other similar words may be used interchangeably as long as they serve to distinguish two or more modes/modules/parts. This is particularly the case in the claims appended herein.

On the other hand, in the embodiments described above, the cutting bars of the hedge trimmer are described to be both driven by the drive motor. That is, both cutting bars can move in opposite directions to facilitate the trimming operation. However, in other possible variations of the embodiments it may also be the case where only one cutting bar is driven by the drive motor, i.e. an active cutting bar, while the other cutting bar is fixed and not able to move, i.e. a passive cutting bar.

The drive motor in the hedge trimmer described above may be a brushless motor or a brushed motor, and the choice of the motor does not pose any limit to the breath of the present invention. In the case of a brushless motor, the hedge trimmer further contains a motor controller which is connected to the drive motor. As skilled persons would understand, the motor controller is used to energize the motor coils to achieve accurate torque and speed output. In this embodiment, the motor controller configured with a built-in motor overload protection function which cuts off the power supply to the drive motor if it is detected that the motor drive current goes over a predetermined limit. However, in the case of a brushed motor without any electronic controller for the motor, the overload protection is done by a circuit board with a controller inside the battery pack, so that the controller cuts off the battery power supply to the hedge trimmer if the drawn current from the battery goes over a predetermined limit. Skilled persons will appreciate that other types of protection means rather than the above two may also be used in the hedge trimmers without departing from the spirit of the present invention.

The invention claimed is:

1. A hedge trimmer, comprising:
a drive motor disposed in a casing;
a blade arrangement having a cutter bar; and
a gear mechanism disposed in the casing and connected to the drive motor, the gear mechanism comprising a first gear setting, a second gear setting, a planetary gear module as part of at least one of the first gear setting and the second gear setting, and an output shaft adapted to drive a drive hub of the cutter bar,
wherein the at least one cutter bar is driven in a reciprocating manner in a longitudinal direction of the blade arrangement by the drive motor via the gear mechanism,
wherein the first gear setting and the second gear setting produce two different gear-ratios, such that the at least one cutter bar is adapted to be driven continuously at a first speed and torque using the first gear setting, and continuously at a second speed and torque different from the first speed using the second gear setting, and
wherein the hedge trimmer further comprises a slidable mode switch disposed on the casing above the blade arrangement and a manual actuator in mechanical communication with the gear mechanism to manually alternate between the first gear setting and the second gear setting based on a position of the manual actuator,
wherein the planetary gear module comprises a ring gear, a first set of planet gears, and a second set of planet gears,
wherein the ring gear is mechanically connected to the manual actuator such that the ring gear is movable along an axial direction thereof to selectively engage the first set of planet gears and the second planet gears,
wherein the manual actuator comprises a lever mechanically connected to the ring gear and the slidable switch to be actuated by a user of the hedge trimmer, and
wherein the lever extends between a first end and a second end and is pivotable around a pivot axis between the first end and the second end such that a sliding movement of the slidable switch results in a movement of the ring gear along the axial direction.

2. The hedge trimmer of claim 1, wherein the planetary gear module is connected between the drive motor and the output shaft.

3. The hedge trimmer of claim 1, wherein the first set of planet gears corresponds to the first gear setting, and
wherein the second set of planet gears corresponds to the second gear setting.

4. The hedge trimmer of claim 1, wherein the manual actuator comprises a lever mechanically connected to the ring gear to be actuated by a user of the hedge trimmer.

5. The hedge trimmer of claim 1, wherein the first set of planet gears is offset from the second set of planet gears along the axial direction.

6. The hedge trimmer according to claim 1, wherein the drive motor is a brushless motor;
the hedge trimmer further comprising a motor controller connected to the drive motor;
the motor controller configured with a built-in motor overload protection.

7. The hedge trimmer according to claim 1, wherein the drive motor is a brushless motor;
the hedge trimmer further comprising a battery pack in which a controller inside the battery pack is provided, so that the controller cuts off the battery power supply to the hedge trimmer if the drawn current from the battery goes over a predetermined limit.

8. A hedge trimmer, comprising:
a casing;
a drive motor disposed in the casing;
a blade arrangement comprising a cutter bar mounted on the casing;
a gear mechanism disposed in the casing and connected to the drive motor, the gear mechanism comprising
a planetary gear module comprising a ring gear, a first set of planet gears arranged in selective engagement with the ring gear at a first gear setting, and a second set of planet gears arranged in selective engagement with the ring gear at a second gear setting, and
an output shaft engaged with the cutter bar to reciprocate the cutter bar along a longitudinal direction,
a manual actuator in mechanical communication with the planetary gear module to manually alternate between the first gear setting and the second gear setting based on a position of the manual actuator,
wherein the cutter bar is adapted to be driven continuously at a first speed and torque using the first gear setting and continuously at a second speed and torque different from the first speed and torque using the second gear setting,
wherein the ring gear is movable along an axial direction thereof to selectively engage the first set of planet gears and the second planet gears,
wherein the hedge trimmer further comprises a slidable switch disposed on the casing apart from the blade arrangement and movable between a first switch position and a second switch position,
wherein the manual actuator comprises a lever mechanically connected to the ring gear and the slidable switch to be actuated by a user of the hedge trimmer,
wherein the lever extends from a first end to a second end, the first end of the lever being connected to the ring gear, and the second end of the lever being connected to the slidable switch, and
wherein the lever extends between a first end and a second end and is pivotable around a pivot axis between the first end and the second end such that a sliding movement of the slidable switch results in a movement of the ring gear along the axial direction.

9. The hedge trimmer of claim 8, wherein the planetary gear module is connected between the drive motor and the output shaft.

10. The hedge trimmer of claim 8, wherein the first set of planet gears has a first number of teeth,
wherein the second set of planet gears has a second number of teeth, the second number of teeth being lower than the first number of teeth.

11. The hedge trimmer of claim 8, wherein the first set of planet gears is offset from the second set of planet gears along the axial direction.

12. The hedge trimmer according to claim 8, wherein the drive motor is a brushless motor;
the hedge trimmer further comprising a motor controller connected to the drive motor;
the motor controller configured with a built-in motor overload protection.

13. The hedge trimmer according to claim 8, wherein the drive motor is a brushless motor;

the hedge trimmer further comprising a battery pack in which a controller inside the battery pack is provided, so that the controller cuts off the battery power supply to the hedge trimmer if the drawn current from the battery goes over a predetermined limit.

\* \* \* \* \*